United States Patent [19]
Schwartz

[11] 3,873,194
[45] Mar. 25, 1975

[54] PHOTO NEGATIVE PROJECTOR

[76] Inventor: Theodore F. Schwartz, 11660 St. Andrews Way, Scottsdale, Ariz. 85254

[22] Filed: Apr. 4, 1973

[21] Appl. No.: 348,175

[52] U.S. Cl.................................. 353/110, 352/103
[51] Int. Cl. ............................................ G03b 23/10
[58] Field of Search..................... 353/110; 352/103

[56] References Cited
UNITED STATES PATENTS

| 1,236,819 | 8/1917 | Balask et al. | 352/103 |
| 1,812,547 | 6/1931 | Nowack et al. | 353/110 |
| 2,093,033 | 9/1937 | Coullery | 352/103 |
| 2,373,392 | 4/1945 | Griswold | 353/110 |

Primary Examiner—Richard E. Aegerter
Assistant Examiner—Steven L. Stephan

[57] ABSTRACT

A photo negative projector, comprising indexing mechanism for indexing spiral-shaped arrays of photo negatives, the indexing mechanism having a rotary member including a spiral-shaped array of indexing portions and a separate film carriage connected thereto having means for aligning a film plate having a corresponding spiral-shaped array of photo negatives, the indexing mechanism comprising a rotatable member provided with a plurality of projections and the projections adapted to engage with the indexing portions of the rotary member, and the rotary member, together with the film carriage coupled thereto, are movable in a rectilinear path as well as being rotatable about a rotary axis, and detent means is adapted to hold the rotary member in a fixed position relative to any one of the indexing portions of the spiral array of indexing portions on said rotary member.

5 Claims, 9 Drawing Figures

PATENTED MAR 25 1975 3,873,194

PHOTO NEGATIVE PROJECTOR

BACKGROUND OF THE INVENTION

The prior art includes patents such as U.S. Pats. No. 1,208,573, 1,236,819, 2,093,033, and 3,450,468, all of which disclose indexing mechanisms of spiral arrays of photo negatives.

The prior art, including the foregoing patents, includes spiral arrays of indexing portions on a rotatable member and also spiral arrays of photo negatives supported on a film carriage, however, the indexing mechanism of the prior art includes rotatable driving means generally actuated by a rotary mechanism and lacks means for simple reverse operation of the indexing mechanism and further, the prior art lacks simple indexing detent means which may contribute precisely to the indexing operation of the spiral arrays of indexing portions of the rotary member as well as the individual frames of photo negatives carried in a spiral array by a film plate which corresponds with the rotary indexing member.

SUMMARY OF THE INVENTION

The present invention comprises a very simple solenoid reciprocated ratchet pawl mechanism or a rotary motor driven mechanism for intermittently rotating a rotatable member which is provided with a plurality of projections successively engageable with a spiral array or row of openings in a rotary member and a fixed detent means is resiliently loaded into and out of respective ones of the openings in the rotary member as the rotatable member and its respective projections move the rotary member from one position to another, corresponding to a distance equalling the spacings of the openings in the spiral array or row in the rotary member.

The invention also comprises a film carriage plate fixed to the aforementioned rotary member and this film carriage plate is adapted to carry a film plate having a spiral array of translucent photo negatives arranged in a spiral array corresponding to the spiral array of openings in the aforementioned rotary member; the invention also comprising alignment means on the film carriage plate and alignment means on the film plate for holding the spiral array of photo negatives in correspondence with the spiral array of openings in the rotary member.

The invention also comprises means mounting the aforementioned rotary member and film carriage plate to reciprocate in a rectilinear path as these members are rotated by the aforementioned reciprocating means or rotary motor driven means for intermittently operating the rotary means for rotating projections thereof into engagement with openings in the rotary member, the detent means of the invention being adapted also to cause advancement of the rotary member and film carriage plate along the rectilinear path aforementioned, so as to allow the rotatable member and its projections, as well as the aforementioned detent, to successively engage in the openings of the spiral array in the rotary member and to advance it and the film carriage plate along a rectilinear path which is disposed at substantially right angles to the axis of rotation of the rotary member.

One mechanism adapted to actuate the rotary member comprises a carriage on which a pair of opposed spring loaded pivoted ratchet pawls are mounted, having opposite ends spaced apart and adapted to engage a projection of the rotatable member aforementioned therebetween so that with each reciprocation of the last mentioned carriage, one of the ratchet pawls pivots past one of said projections and is in position to abut a projection so that reverse movement of the carriage will cause rotation of the rotatable member moving one of its projections into one of the openings of the rotary indexing member to advance it a distance equal to the spacing of the openings in said spiral array.

The reciprocating ratchet pawl carriage is operated in opposite directions by a pair of opposed solenoids and these solenoids are provided with spring loaded armatures so that the ratchet pawl carriage is automatically returned to a neutral position wherein one projection of the rotatable indexing mechanism is disposed between opposed ends of adjacent opposed ratchet pawls pivotally mounted on said carriage and whereby successive operation of one of the solenoids will rotate the rotatable member together with the rotary member and the film carriage plate in one direction and whereby successive operation of the other one of the solenoids will cause the opposite direction of rotation of the rotary member and the film carriage plate while the aixs of rotation of the rotary member may move along the aforementioned rectilinear path as the openings in the spiral array of openings in the rotary member are successively presented to a fixed location relative to the frame of the machine of the invention so that projection of light may be projected through a corresponding photo negative of film plate carried by the film plate carriage operated by the rotary member of the mechanism of the invention.

The rotary motor driven mechanism actuates the aforementioned rotatable member by means of a gear motor driven paddle wheel like, member having a plurality of substantially radial projections which successively engage projections of said rotary member and a limit switch is also successively engageable by said radial projections to control intermittent operation of said gear motor which rotates said paddle wheel like member.

Accordingly, it is an object of the present invention to provide a very simple and positive means for the projection of images from a spiral array of photo negatives.

Another object of the invention is to provide a novel indexing mechanism utilizing a rotary member having a spiral array of openings therein and a rotatable member having a plurality of radial projections opposed by a fixed detent adapted opposingly to engage one opening at a time in said spiral array for disposing a film carriage plate with a spiral array of negatives thereon so as to juxtapose one of said negatives at a time relative to a fixed position and a projector light source.

Another object of the invention is to provide a novel opposed solenoid mechanism, or rotary motor driven mechanism, adapted selectively to rotate a spiral array of photo negatives in either of two directions while at the same time causing the array to move along a rectilinear path at substantially right angles to the axis of rotation of the spiral array.

Further objects and advantages of the invention may be apparent from the following specification, appended claims and accompanying drawings.

DESCRIPTION OF THE PREFERRED EMBODIMENTS

Figure 1:
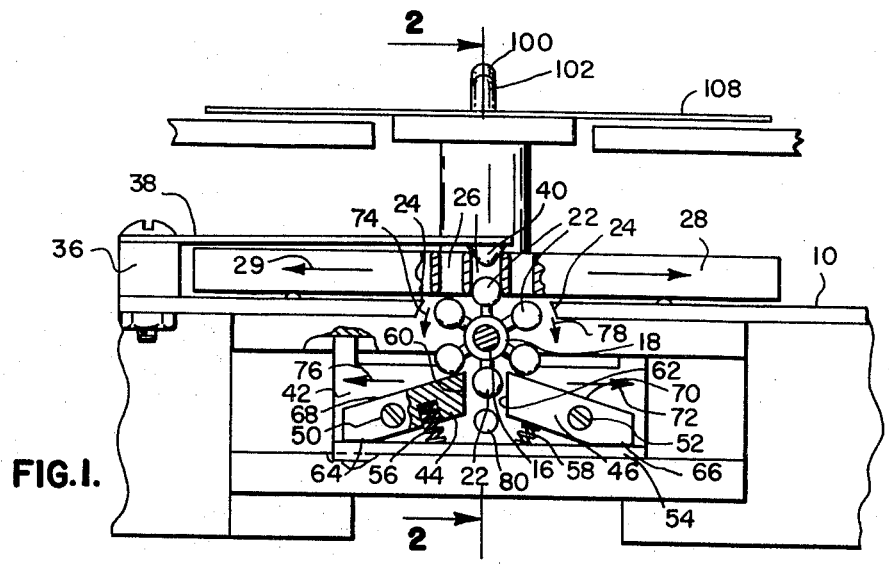
FIG. 1 is a fragmentary elevational view of a photo negative projector mechanism, showing portions thereof broken away and in section to amplify the illustration.

As shown in FIG. 1 of the drawings, the photo projector mechanism of the invention includes a frame having a mounting plate 10 which carries a bearing plate 12 on the normally lower side thereof. Fixed in a bore 14 of the bearing plate 12 is a shaft 16 on which is mounted a rotatable member 18 adapted to rotate about the axis of the shaft 16 about which the rotatable member 18 is rotated, as will be hereinafter described in detail.

Figure 5:
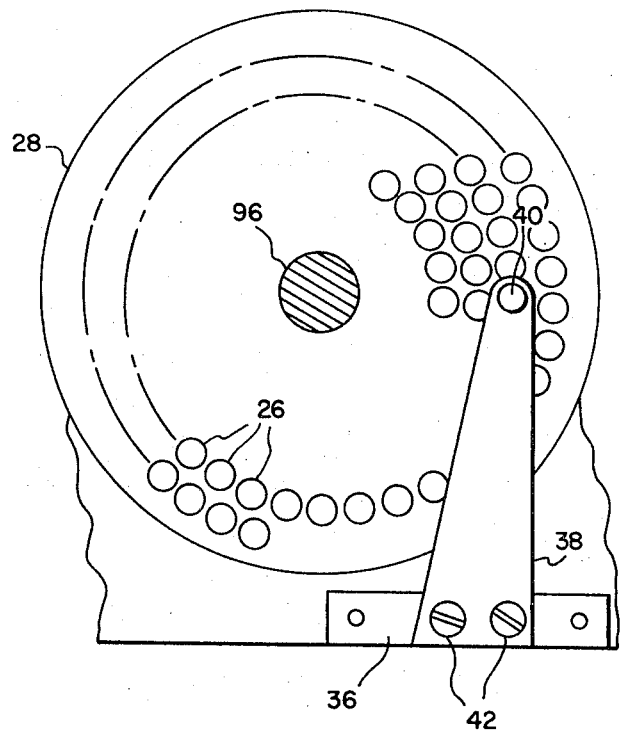
FIG. 5 is a plan sectional view taken from the line 5—5 of FIG. 2, showing the rotary member of the indexing mechanism together with a spiral array of openings therein, and a spring loaded detent engageable successively with the various openings of said spiral array.
Figure 6:
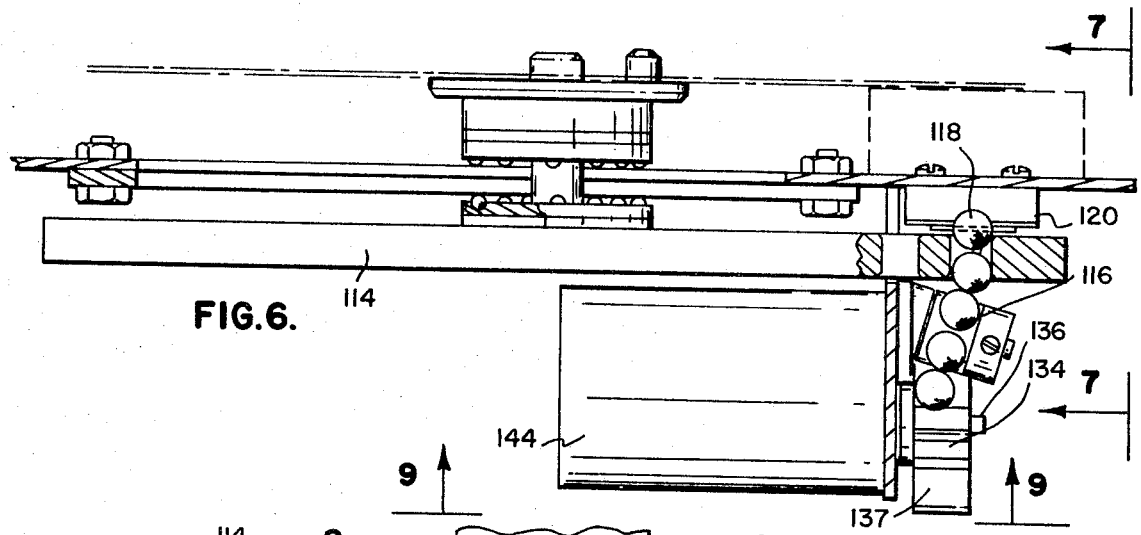
FIG. 6 is a view similar to FIG. 2 showing a modification of the invention.
Figure 7:
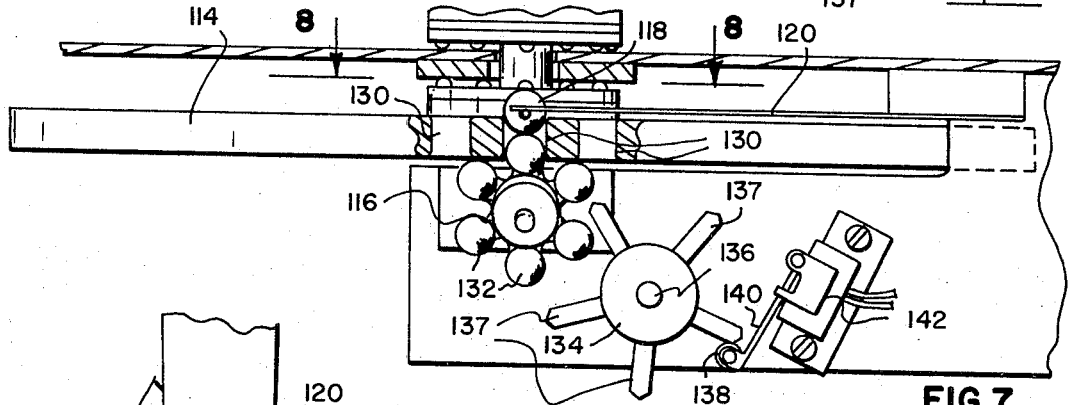
FIG. 7 is an elevational view of the mechanism of FIG. 6 taken from the line 7—7 thereof and showing portions broken away and in section to amplify the illustration.

The frame plate 10 is provided with an opening 24 through which the spherical projections 22 of the rotatable member 18 extend into engagement successively with openings 26 in a rotary member 28 disposed above the frame plate 10. The rotary member 28 is provided with a spiral array of the openings 26, as shown best in FIG. 5 of drawings, and the rotary member is also provided with a central bearing hub 30 mounted in an elongated slot 32 of the frame plate 10. This slot 32 is adapted to provide a rectilinear path for movement of the rotary member 28 laterally of its axis of rotation, designated 34 in FIG. 2 of the drawings. Thus the rotary member 28 is adapted to rotate about its axis of rotation 34 and to move in the slot 32 in a direction at substantially right angles to said axis of rotation 34, all this being accomplished with relation to the rotatable member 18 in engagement with the openings 26 of the spiral array of openings in the rotary member 28, all as will be hereinafter described in detail.

Fixed on the frame plate 10 is a mounting block 36 on which is fixed a detent spring 38, this spring being a plate spring carrying a substantially conical detent 40. The spring 38 is fixed by screws 42 on the block 36, as shown best in FIG. 5 of the drawings, and the detent 40 is urged by resilient action of the spring 38 into engagement within upper open ends of the openings 26 of the rotary member 28 and these openings 26 are successively engaged as the rotary member 28 rotates about its axis of rotation 34, as will be hereinafter described, the detent 40 being directly opposed to the respective projection 22 of the rotatable member 18, as shown in FIG. 1, at a fixed position relative to the frame 10 as determined by the detent 40 in connection with the detent spring 38. The conical shape of the detent 40 is such that rotation of the rotary member 28 causes the detent 40 to spring out of each respective opening 26 and drop into the next successive opening 26 due to resilient force of the spring 38 forcing the detent 40 into the respective opening 26.

The successive traverse of the rotary member 28 in a rotary direction about its axis 34 causes successive engagement of the detent 40 with the respective openings 26 and the rotation of the rotary member 28 is caused by rotation of the rotatable member 18 about the axis of the shaft 16 and rotation of the rotatable member 18 is caused by reciprocating movement of a ratchet carriage 42 and ratchet pawls 44 and 46.

The ratchet carriage 42 is reciprocally mounted in a stationary carriage track 48 and the ratchet pawls 44 and 46 are pivotally mounted on screws 50 and 52, respectively, fixed to the carriage 42. The carriage 42 is provided with a ledge 54 supporting springs 56 and 58 which tend to pivot the ratchet pawls 44 and 46 upwardly at their respective opposed pawl ends 60 and 62. These ends 60 and 62 are opposed to each other and spaced apart a distance substantially greater than the diameter of the spherical projections 22 of the rotatable member 18. The pawls 44 and 46 are provided with respective stops 64 and 66 which engage the ledge 54 of the carriage 42, limiting upward movement of the pawls urged by the springs 56 and 58. These pawls 44 and 46 are provided with inclined surfaces 68 and 70 adapted slidably to move beneath the lowermost one of the spherical projections 22 when the carriage is moved in one direction one of the pawls sliding under the respective projection while the pawl end portion 60 and 62 engages a respective spherical projection and drives it in a rotary direction in accordance with the particular direction of movement of the carriage 42.

As for example, when the carriage 42 is moved in the direction of an arrow 72, the end 60 of the pawl 44 is engaged with a projection 22 and the resultant rotation of the rotatable member 18 is in the direction of an arrow 74. When the end 62 of the pawl 46 is moved in the direction of an arrow 76, by the carriage 42, the rotatable member is moved or rotated in the direction of an arrow 78, all as shown in FIG. 1 of the drawings.

Figure 2:
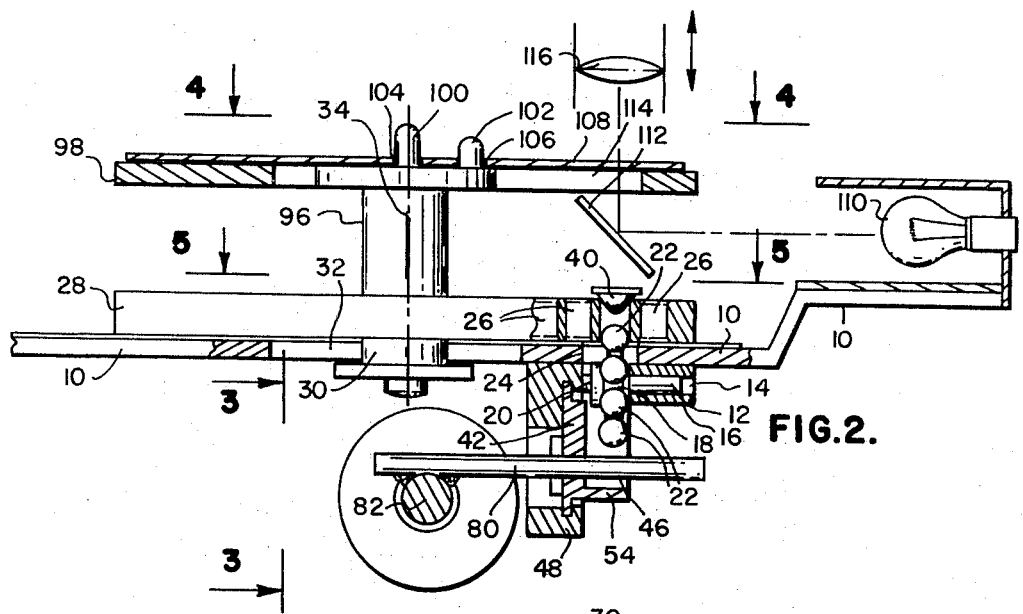
FIG. 2 is a fragmentary sectional view of the mechanism taken from the line 2—2 of FIG. 1, showing parts and portions in elevation to simplify the illustration.
Figure 3:
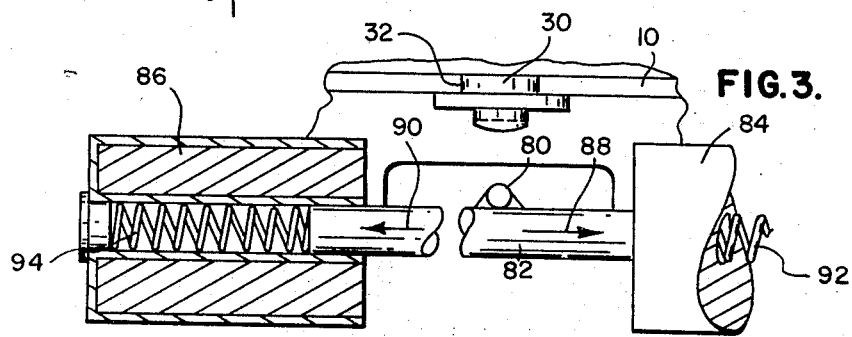
FIG. 3 is a fragmentary elevational view taken from the line 3—3 of FIG. 2 and showing portions broken away and in section to amplify the illustration.

The carriage 42 is driven by a pin 80 which projects through the carriage 42 and is connected to a reciprocal armature 82, shown best in FIGS. 2 and 3 of the drawings. This armature 82 is electromagnetically activated by solenoids 84 and 86 which may be selectively energized by appropriate switches for moving the armature 82 and pin 80 in the directions of the arrows 88 and 90 which correspond with the arrows 76 and 72, respectively, as shown in FIG. 1 of the drawings.

Return springs 92 and 94 in the solenoids 84 and 86 act against opposite ends of the armature 82 for returning the pin 80 and the carriage 42 to a central position in which the opposite ends of the pawls 60 and 62 are slightly spaced from opposite sides of one of the projections 22 of the rotatable member 18, all as shown best in FIG. 1 of the drawings.

Figure 4:
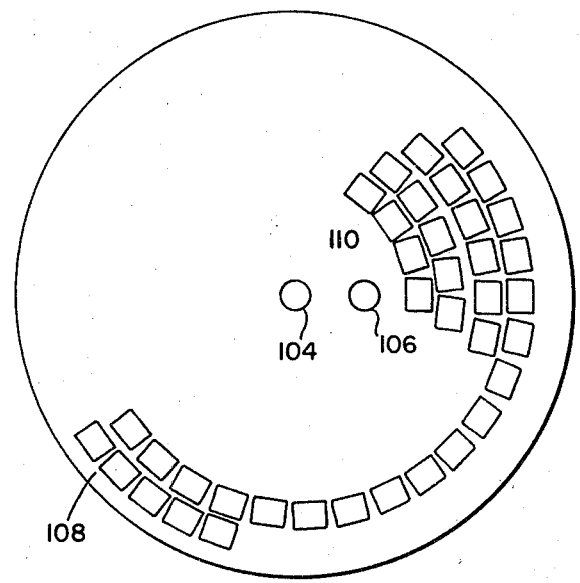
FIG. 4 is a plan sectional view taken from the line 4—4 of FIG. 2, showing a film plate having a spiral array of photo negatives therein.

It will be seen that successive energization of one of the solenoids 84 and 86 will rotate the rotatable member 18 and the rotary member 28 in one respective direction while consecuitve energization of the other solenoid will rotate the rotatable member 18 and the rotary member 28 in the opposite direction so that the spiral array of openings 26 in the rotary member 28 may be completely traversed from one end of the spiral array to the other, in either direction, and it will be seen that the hub 30 of the rotary member 28 is provided with an upstanding portion 96 which carries a film plate carriage 98 which is generally a disc shaped plate provided with a central aligning pin 100 and an eccentric aligning pin 102. These aligning pin 100 and 102 correspond with openings 104 and 106 in a film plate 108 which carries a spiral array of transparent or translucent photo negatives 110, all as shown best in FIGS. 2 and 4 of the drawings.

The spiral array of photo negatives 110 is coordinated with the spiral array of openings 26 and relative to a fixed position of the detent 40 and a respective projection 22 of the rotatable member 18.

A light source 110 is carried by the frame plate 10 and is adapted to cast light on a mirror 112 which projects light through an opening 114 in the film carriage plate and to a lens 116 which is adapted to be used in connection with various prisms, mirrors or other display devices for casting an image on a suitable screen, or display plate.

It will be seen that the detent 40 and the respective projection 22 of the rotatable member 18 are substantially in alignment with the rectilinear path of the elongated slot 32 in the frame plate 10 which is traversed by the hub 30 of the rotary member 28 in a direction at substantially right angles to its axis of rotation.

In operation, the solenoids 84 and 86 may each be individually operated successively to rotate the rotary member 28 in one direction or the other, respectively, and when the solenoid 86 is energized, as for example, the carriage 42 is moved in the direction of the arrow 72 by attraction of the armature 90 in that direction, carrying the pin 80 and the carriage 42 in the slotted track 48. The end 60 of the pawl 44 engages a projection 22 of the rotatable member 18 and moves the rotatable member 28 in the direction of an arrow 29, shown in FIG. 1. Energization of the solenoid 84 causes the opposite movement of the rotatable member 18 by engagement of the end 62 of the pawl 46, and as each pawl returns to neutral position, its inclined portion 68 and 70 slides under the respective projection 22 of the rotary member 18 while the detent 40 holds the rotary member 28 and the rotatable member 18 in juxtaposition.

The hub 30 of the rotary member 18 is automatically advanced longitudinally in the slot 32 toward or away from the fixed position of the detent 40 and the respective projection 22 of the rotatable member 18, simply by conical nesting of the detent 40 and respective projection 22 in opposite ends of the respective opening 26 of the spiral array of openings 26 in the rotary member 28, thus camming action of the detent 40 and the respective projection 22 causes the hub 30 of the rotary member 28 to slide longitudinally in the slot 32 along a rectilinear path at substantially right angles to the axis of rotation 34 of the rotary member 28.

With reverse action of the carriage 42 and inclined engagement of the inclined portions 68 and 70 of the pawls 44 and 46, the springs 56 and 58, respectively, may be compressed depending upon the direction of movement of the carriage 42 and the respective depression of one of the pawls 44 and 46 below a respective projection 22, all dependent upon the direction of movement of the carriage 42.

It will be seen that the detent 40, together with one of the projections 22, determines the fixed position of one of the openings 26 in the spiral array of openings 26 in the rotary member 28, and also a corresponding fixed position of one of the photo negatives 110 of the film plate 108, supported on the film plate carriage 98, and held by the alignment pins 100 and 102. The aforementioned fixed position is in alignment with the light source 110 at its direction to the mirror 112 and lens 116.

It will be appreciated by those skilled in the art that the photo negatives 110 may be successively cycled into a fixed position and indexed with a beam of light from the light source 110 as cast by the mirror 112 and that the lens 116 receives the image for projection to a screen or image plate. With energization of one of the solenoids 84 and 86, the photo negatives 110 may be successively illuminated from one end of the spiral array to the other in correspondence with the indexing openings 26 in the rotary member 28.

The use of the solenoids 84 and 86, together with the reciprocating carriage 42 and pawls 44 and 46, together with the rotatable member 18, provide a very simple manner of successively presenting images from the photo negatives 110 by a simple switching operation which may be electrically accomplished in connection with the solenoids 84 and 86, depending upon the direction in which it is desired to drive the rotary member 28.

In the modification of the invention as shown in FIGS. 6 to 9, inclusive, a rotary member 114 is similar to the rotary member 28 hereinbefore described and a rotatable member 116 is similar to the rotatable member 18 hereinbefore described.

Figure 8:
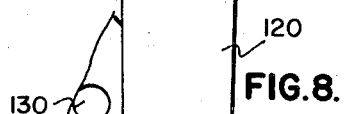
FIG. 8 is a fragmentary plan view taken from the line 8—8 of FIG. 7.
Figure 9:
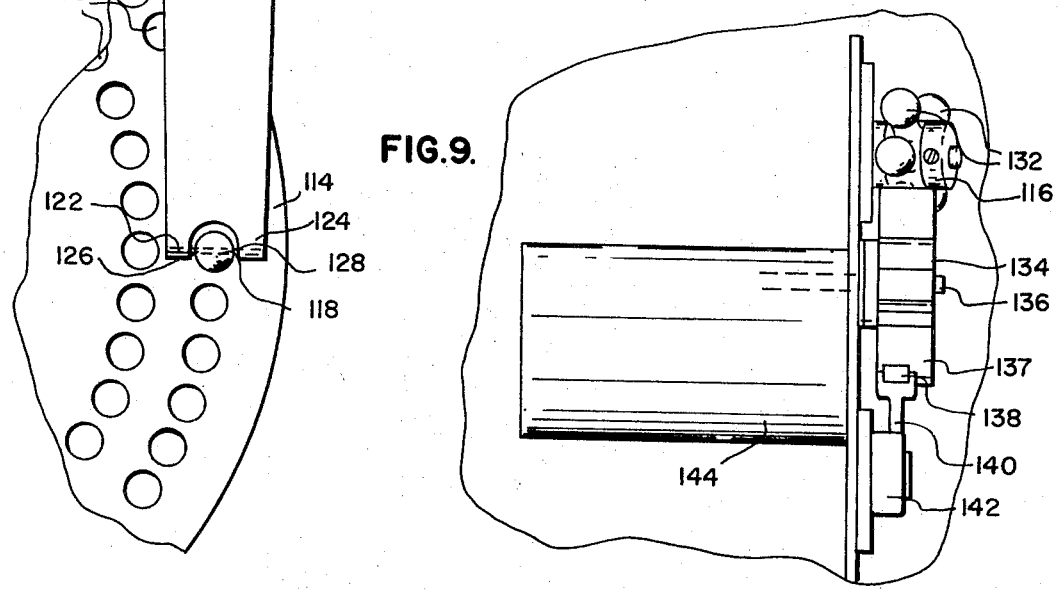
FIG. 9 is a fragmentary view taken from the line 9—9 of FIG. 6.

A detent 118 is similar to the detent 40 hereinbefore described, however the detent 118 is provided with a plate spring 120 having a bifurcated portion comprising a pair of trunion bearings 122 and 124 as shown in FIG. 8 wherein axel portions 126 and 128 of the detent 118 are rotatably mounted so that the detent member 118 is a generally spherical member rotatably mounted in connection with the plate spring 120 so as to rotatably and successively engage indexing openings 130 similar to the indexing openings 26 hereinbefore described.

The rotatable member 116 is provided with a plurality of spherical projections 132, as an example, there being six of these projections, one of which is adapted to be engaged in one of the indexing openings 130 opposite to the detent 118.

A paddle wheel like rotatable member 134 is rotatably mounted about its shaft 136 and is provided with a plurality of paddles 137 adapted successively to engage the projections 132 for rotating the rotatable member 116 in a similar manner to that of the rotatable member 18 hereinbefore described. It will be noted that the paddle wheel like member 134 is provided with only five of the paddle like projections 137 while there are at least six detent projections 132 on the rotatable member 116 and these paddle like members 137 are each successively engageable with a roller 138 on a microswitch arm 140 adapted to operate a microswitch 142 connected with the arm 140 and this microswitch 142 is electrically coupled to a gear motor 144 having the shaft 136 projecting therefrom and carrying the paddle wheel like member 134.

The gear motor is a high ratio motor and the engagement of the switch actuating roller 138 by one of the paddle like members 137 shuts the motor off while another one of the paddle like members 137 coasts to a contact position with one of the spherical projections 132. During this time the motor almost stops due to its high gear reduction and when the paddle like member 137 contacts the respective spherical projection 132, the motor is stopped automatically due to tension of the spring 120 holding the detent 118 firmly therein, consequently a manual or other operated switch is then required to start the motor 144 through another cycle to rotate the paddle wheel like member 134 a sufficient distance to cause another one of its paddle like projections 137 to successively contact the switch actuating roller 138 and to allow the next paddle like member 137 to engage the respective projection 132 on the rotatable member 116 which is held in position in one of the openings 130 retained by the detent 118 with sufficient force to stop the operation of the motor 144 in place for another successive indexing operation. The motor 144 may be operated by suitable circuitry to maintain it in continuous operation for moving the rotary member 114 with respect to several of the openings 130 passing the detent 118 or the circuitry may be operated in such a manner as to energize the motor 144 momentarily until shut off by the switch 142 as hereinbefore described whereupon successive energization of the motor is again shut off by the switch 142.

It will be appreciated that the modification shown in FIGS. 6 to 9 of the drawings provides means which may be used alternately relative to the carriage and pawl mechanism shown in FIG. 1 of the drawings and it is to be noted that the modified structure shown in FIGS. 6 to 9 of the drawings is the preferable.

It will be obvious to those skilled in the art that various modifications of the invention may be resorted to without departing from the spirit of the invention.

I claim:

1. In a photonegative projector, the combination of: an indexing mechanism for spiral shaped arrays of photo negatives; said mechanism having a frame; a rotary member having a spiral shaped means including an array of indexing portions rotatably mounted on said frame to rotate about an axis of rotation; first means also mounting said rotary member to move freely in a rectilinear path generally normal to said axis of rotation; second meand adapted to rotate said rotary member successively from one of said indexing portions to an adjacent one of said indexing portions of said spiral array; stationary means of said second means engageable with said spiral shaped means; said stationary means stationarily mounted on said frame and adapted to cause said rotary member to move in said rectilinear direction normal to said axis of rotation when said rotary member is rotated about said axis of rotation; whereby each of said indexing portions on said rotary member may move into registry with a fixed position relative to said frame; a film carriage coupled to and movable with said rotary member and spaced therefrom; said film carriage having first alignment means; (adapted to coordinate) a spiral array of negatives; a spiral film plate on said film carriage said alignment means adapted and disposed to coordinate respective ones of said negatives relative to respective ones of said spiral array of indexing portions on rotary member; an illuminater means mounted on said frame and adapted to project light to a position on said film carriage corresponding with said fixed position to which said indexing portions of said rotary member progressively move; said rotary member is provided with first and second opposite sides disposed at right angles to said axis of rotation; said indexing portions comprising openings extending through said rotary member from said first side to said second side; said second means comprises a rotatable member having radial projection means disposed so as to progressively engage in said openings at one of the sides of said rotary member; said rotatable member rotatably mounted on said frame on a second axis substantially at right angles to said axis of rotation; said rotatable member restrained against movement relative to said frame in a direction longitudinally of said second axis; said stationary means having a spring loaded detent successively engageable within said openings at one of the sides of said rotary member for successively holding each of said indexing portions in said fixed position; said detent is disposed concurrently to engage the same one of said holes in which said projection means of said rotatable member engages; said detent and said (projections) projection means both being substantially in alignment with said rectilinear path of said first means.

2. In a photonegative projector, the combination of: an indexing mechanism for spiral shaped arrays of photo negatives; said mechanism having a frame; a rotary member having a spiral shaped means including an array of indexing portions rotatably mounted on said frame to rotate about an axis of rotation; first means also mounting said rotary member to move freely in a rectilinear path generally normal to said axis of rotation; second means adapted to rotate said rotary member successively from one of said indexing portions to an adjacent one of said indexing portions of said spiral array; stationary means of said second means engageable with said spiral shaped means; said stationary means stationarily mounted on said frame and adapted to cause said rotary member to move in said rectilinear direction normal to said axis of rotation when said rotary member is rotated about said axis of rotation; whereby each of said indexing portions on said rotary member may move into register with a fixed position relative to said frame; a film carriage coupled to and movable with said rotary member and spaced therefrom; said film carriage having first alignment means; (adapted to coordinate) a spiral array of negatives, a spiral film plate on said film carriage; said alignment means adapted and disposed to coordinate respective ones of said negatives relative to respective ones of said spiral array of indexing portions on said rotary member; and an illuminater means mounted on said frame and adapted to project light to a position on said film carriage corresponding with said fixed position to which said indexing portions of said rotary member progressively move; said rotary member is provided with first and second opposite sides disposed at right angles to said axis of rotation; said indexing portions comprising openings extending through said rotary member from said first side to said second side; said second means comprising a rotatable member having an annular row of radial projections disposed and spaced apart so as to progressively engage in said openings in one of the sides of said rotary member; motor driven mechanism adapted to actuate said rotatable member; said motor driven mechanism comprising a gear motor; a paddle wheel like member driven by said gear motor; said paddle wheel like member having a pleurality of substantially radial projections disposed successively to engage projections of said rotatable member; an a limit switch disposed to be successively engaged by said radial projections of said paddle wheel like member to control intermittent operation of said gear motor which operates said paddle wheel like member.

3. The invention as defined in claim 2, wherein: said paddle wheel like member is provided with a lesser number of radial projections than the number of said projections of said rotatable member.

4. The invention as defined in claim 2, wherein: said stationary means comprises a spring loaded detent successively engageable within said openings at one of the sides of said rotary member for successively holding each of said indexing portions successively in fixed position; said detent means being disposed concurrently to engage the same one of said holes in which one of said projections of said rotatable member is engaged; said detent and said one of said projections being substantially in alignment with said rectilinear path of said first means.

5. The invention as defined in claim 2, wherein: said stationary means comprises a spring loaded generally spherical rotary detent successively engageable within said openings at one of the sides of said rotary member for successively holding each of said indexing portions momentarily in said fixed position.

* * * * *